(No Model.) 2 Sheets—Sheet 1.
G. A. STROUT.
BUNDLE CARRIER FOR HARVESTER BINDERS.
No. 325,710. Patented Sept. 8, 1885.
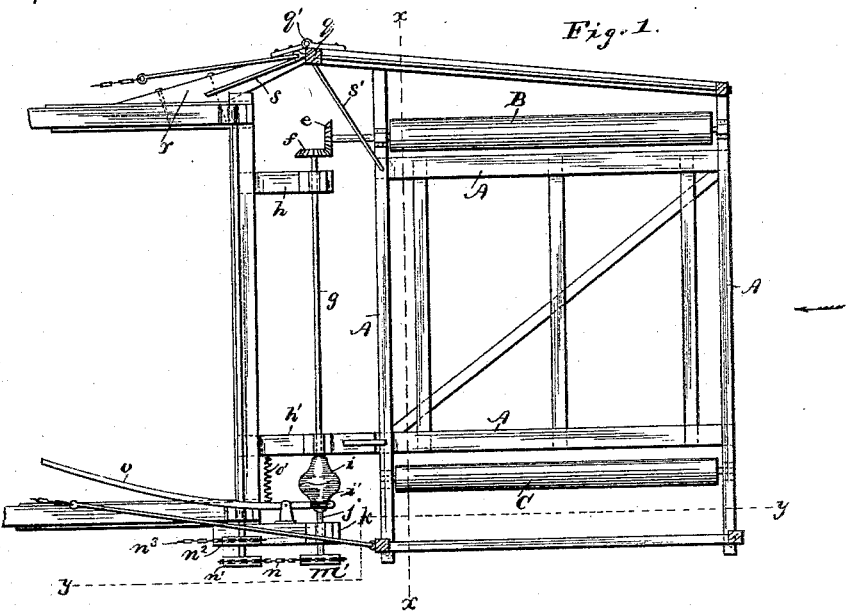
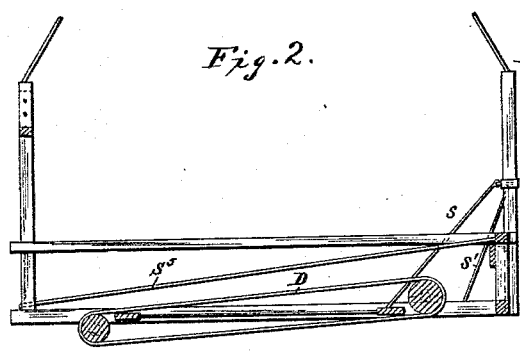
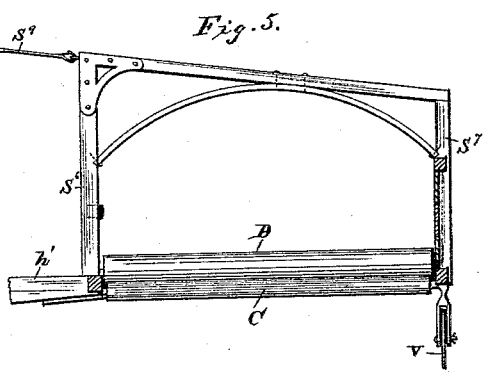
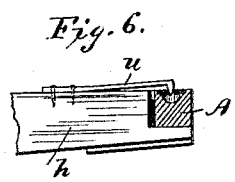
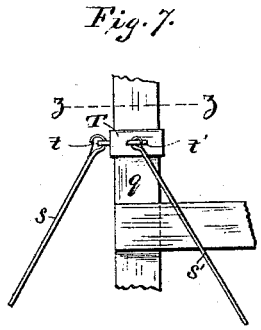
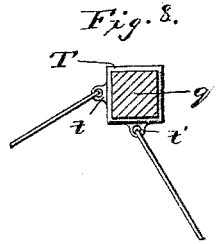
WITNESSES
Chas. R. Burr
Fred F. Church
INVENTOR
George A. Strout
by Church & Church
his Attorneys (No Model.) 2 Sheets—Sheet 2.
G. A. STROUT.
BUNDLE CARRIER FOR HARVESTER BINDERS.
No. 325,710. Patented Sept. 8, 1885.
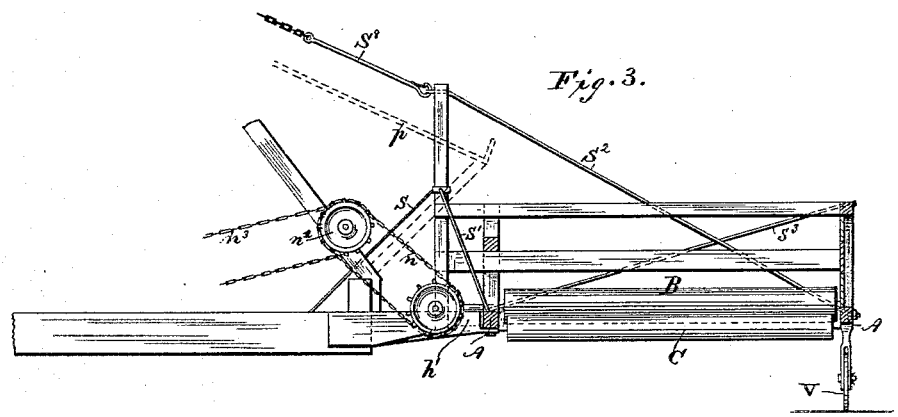
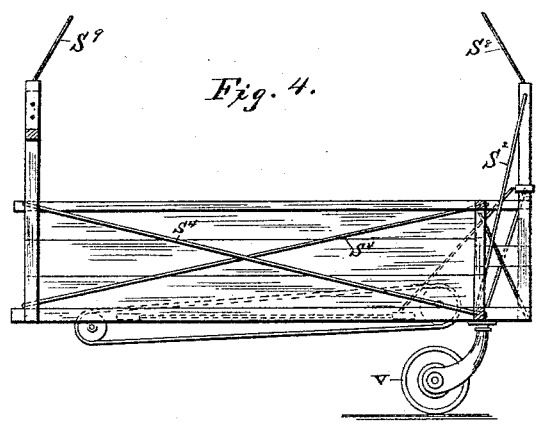
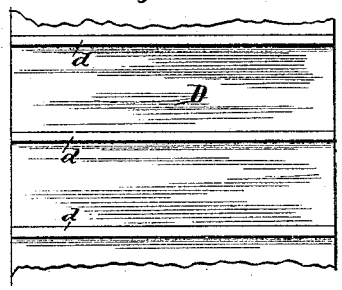
WITNESSES
Chas. R. Burr
Fred F. Church
INVENTOR
George A. Strout
by Church & Church
his Attorneys

UNITED STATES PATENT OFFICE.

GEORGE A. STROUT, OF LISBON, DAKOTA TERRITORY.

BUNDLE-CARRIER FOR HARVESTER-BINDERS.

SPECIFICATION forming part of Letters Patent No. 325,710, dated September 8, 1885.

Application filed December 13, 1884. (No model.)

*To all whom it may concern:*

Be it known that I, GEORGE A. STROUT, of Lisbon, in the county of Ransom, Dakota Territory, have invented certain new and useful Improvements in Bundle-Carriers for Harvester-Binders; and I do hereby declare the following to be a full, clear, and exact description of the same, reference being had to the accompanying drawings, forming a part of this specification, and to the figures and letters of reference marked thereon.

My invention has for its object to provide an improved bundle-carrier for harvester-binders which can be readily attached or detached from the binder when necessary or swung out of the way to permit access to the binding-table, the function of said bundle-carrier being to receive the bound bundles as they are ejected from the binding-table and retain the same until a sufficient number have been collected, when they are discharged upon the ground by means of mechanism controlled at will by the driver.

I will now proceed to describe the construction and operation of my improved bundle-carrier, and will then point out its particular features of novelty in the claims at the end of this specification.

In the accompanying drawings, Figure 1 is a top plan view of my improved carrier and of enough of the frame of the binder to illustrate the manner of attachment. Fig. 2 represents a sectional view of the same, taken on the line $x\ x$, Fig. 1; Fig. 3, a sectional view taken on the line $y\ y$, Fig. 1; Fig. 4, a side elevation, looking in the direction of the arrow, Fig. 1; Fig. 5, an end view of the carrier-frame; Fig. 6, a detail view showing the automatic locking device for connecting the free end of the carrier to the frame of the binder. Fig. 7 is a detail view of the post or standard and the brace-rods connected thereto at the hinging-point of the carrier. Fig. 8 is a sectional view of the same, taken on the line $z\ z$, Fig. 7. Fig. 9 is a view of a portion of the endless apron of the carrier.

Similar letters of reference in the several figures indicate the same parts.

A represents the main frame of the carrier. This frame supports, near its forward end, a roller, B, extending transversely of it, and near its rear end it supports another and parallel roller, C. Over and around these rollers is arranged an endless belt or platform, D, consisting of a wide belt of canvas or other flexible material, having cross-bars $d$ secured to its outer surface, as shown in Fig. 9, or of a series of narrow belts having cross-pieces, the particular form of endless platform being immaterial, any of the ordinary forms serving the purpose. The shaft of the roller B is extended somewhat, and is provided with a bevel-pinion, $e$, which is adapted to engage the corresponding bevel-pinion, $f$, located on a shaft, $g$, that is mounted in arms or bearings $h\ h'$, extending out from the binder-frame. Upon the rear end of the shaft $g$ is mounted one portion, $i$, of a friction-clutch, the other portion, $i'$, of which is mounted upon a short shaft, $j$, so as to turn with said shaft, though be capable of a limited movement thereon, such construction being common in friction-clutches. The shaft $j$ is supported in an arm, $k$, which projects out from the binder-frame and bears a sprocket-wheel, $m$, to which motion is imparted from the driving mechanism of the binder through a chain, $n$, sprocket-wheels $n'$ $n^2$, and another chain, $n^3$, as shown in Figs. 1 and 3.

Connected to the movable part $i'$ of the friction-clutch is a pivoted lever, $o$, which is under the control of the driver, and has connected to it a spring, $o'$, which operates to carry it into the position which will throw the friction-clutch out of operation.

In Fig. 3 I have shown in dotted lines $p$ a portion of the table of the binding-machine proper on which the bundles are bound and from which they are ejected. Directly beneath the edge of this table, or a little forward of it, the endless platform of the bundle-carrier is located, so that when the bound bundles are dropped from the binding-table they will fall upon such endless platform. When a sufficient number of bundles have accumulated upon the platform, the driver, by operating upon the lever $o$, throws the movable and constantly-running portion $i'$ of the friction-clutch into engagement with the portion $i$ of said clutch, and thus, through the medium of the shaft $g$ and beveled pinions $e\ f$, causes the endless platform to move toward the rear of the machine and the accumulated bundles to be simultaneously dropped upon the ground. The bundle-carrier has at the inner corner of its forward end a vertical post or standard, $q$, which is connected near its bottom by a suitable hinge, $q'$, to a stout timber or arm, $r$, that projects from the main frame of the binder, as shown in Figs. 1 and 3. The said post is braced and held in vertical position by means of rods $s$ $s'$, connected at their lower ends to the supporting-arm $r$ of the binder and the frame of the bundle-carrier, respectively, and at their upper ends to eyes $t$ $t'$, formed on a collar, T, which encircles said post, and forms a simple and convenient means for securing the rods to said post, as shown clearly in Figs. 7 and 8. The rod $s$ is provided at its upper end with a hook, so that when it is desired to swing the carrier around it can readily be unfastened from the eye $t$. The carrier-frame is strengthened and supported at its front by the diagonal rods $s^2$ $s^3$, at its outer side by the diagonal rods $s^4$ $s^4$, at its inner side by the diagonal rod $s^5$, and at its rear end by the uprights or standards $s^6$ $s^7$, connected and braced as shown in Fig. 5. When the carrier is swung around into the position shown in Fig. 1, its longitudinal frame-timber A rests upon a shoulder formed at the outer end of the rear timber, $h'$, that projects from the binder-frame, and an automatically-operating spring-catch, $u$, secured to said timber $h'$ engages with the slot or recess in said timber A, thus effectually locking the parts together. It will be observed that as thus arranged the bundle-carrier is supported at its forward end by the hinged connection $q$, and at its rear end by the timber $h'$. As a further means of support, a jointed rod or chain, $s^8$, connected at one end to the upper end of the standard $q$ and at the other end to some part of the binder-frame, is provided, and a similar jointed rod or chain, $s^9$, is connected to the top of the rear post, $s^6$, and in like manner extends to the binder-frame, and is provided with a hook or spring-catch at its outer end, so that it can be disconnected from the post $s^6$ when it is desired to swing the carrier around. At the forward outer corner of the carrier I preferably locate a caster-wheel, $v$, for the purpose, mainly, of supporting the carrier while going over uneven ground, especially when the machine is low. The carrier is thus enabled to rise and fall independently of the binder, and its operation is not affected by inequalities of the surface.

When for any purpose it becomes necessary to have access to the binder-table, the spring-catch $u$ and rods $s$ and $s^9$ may be disengaged, and the whole carrier swung around on its hinge $q'$ out of the way. When this is done, the various bracing-rods applied to the carrier-frame, and especially the bracing-rods which are connected to the upright or standard $q'$ become of the highest importance in sustaining the carrier and preventing all the strain from falling on the hinge $q'$.

I preferably arrange the carrier so that it can be readily unhinged from the binder and entirely removed, thus enabling the binder to pass over narrow bridges or through gateways.

The chief advantage derived from the use of my improved bundle-carrier is that it enables the driver to accumulate a number of bundles on the carrier and to dump them at will upon the ground at any desired place in quantities sufficient to form a shock, thus rendering it unnecessary for the bundles to be gathered up one by one from the field, as ordinarily.

My improved attachment can be applied to the ordinary harvester-binders at present in use with little trouble and, except in few instances, without special adaptation.

The mechanical devices for applying power which I have shown are of ordinary simple construction, and I do not of course desire to limit myself to their use solely, as their well-known and recognized mechanical equivalents would serve equally well; nor do I wish to be limited to the application of the power to the forward roller of the endless platform or apron, as it is obvious that the power might be applied to the other roller or to both of them. I prefer, however, the arrangement shown, and in practice it will be found to work well.

Having thus described my invention, I claim as new—

1. The combination, with a harvester-binder, of a bundle-carrier hinged to the frame of said binder, so as to be swung toward and away from the binding-table, and having an endless platform for receiving the bound bundles as they drop from the binding-table, and mechanism, substantially as described, for operating the endless platform by the driving mechanism of the binder, as set forth.

2. The combination, with a binder, of a bundle-carrier hinged to the binder so as to be swung toward or away from the binding-table, and having an endless platform for receiving the bundles as they drop from the binding-table, mechanism, substantially such as described, for operating the endless platform from the driving mechanism of the binder, and the clutch under the control of the driver for throwing the endless platform into or out of action, substantially as described.

3. The combination, with a binder, of a bundle-carrier hinged to said binder and having an endless platform or belt, a gear on one of the rollers of said platform, a shaft mounted on the binder and having the gear for meshing with the gear on the roller, and the friction-clutch under the control of the driver, substantially as described.

4. The combination, with the binder, of the bundle-carrier hinged thereto having the endless platform for receiving the bound bundles of grain and adapted to be swung toward or away from the binding-table, and a locking device, substantially as described, for locking the free end of the carrier-frame when swung around into operative position, substantially as described.

5. The combination, with the binder, of the bundle-carrier hinged thereto having the endless platform for receiving the bound bundles of grain and adapted to be swung toward and away from the binding-table, a timber for supporting the free end of the carrier when swung into operative position, and means for locking the carrier to said timber, substantially as described.

6. The combination, with the timber projecting from the binder-frame, of the bundle-carrier hinged to said timber, the other timber upon which the free end of the carrier is supported, the caster-wheel upon the carrier-frame, and the jointed rods or chains connecting the inner vertical posts of the carrier-frame to the frame of the binder, substantially as described.

7. The combination, with the timber projecting from the binder-frame, of the carrier-frame having the vertical post or standard hinged to said timber, the collar upon said vertical post, and the diagonal brace-rods connected to said collar and fastened at their lower ends to the carrier-frame and to the timber to which said frame is hinged, respectively, substantially as described.

GEORGE A. STROUT.

Witnesses:
G. LA DU,
C. D. AUSTIN.